(12) United States Patent
Schneider et al.

(10) Patent No.: US 8,579,761 B2
(45) Date of Patent: Nov. 12, 2013

(54) GEARSHIFT CONTROL METHOD FOR A MOTOR VEHICLE

(75) Inventors: Florian Schneider, Lindenberg (DE); Roland Mair, Tettnang (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 13/642,241

(22) PCT Filed: Mar. 2, 2011

(86) PCT No.: PCT/EP2011/053109
§ 371 (c)(1),
(2), (4) Date: Oct. 19, 2012

(87) PCT Pub. No.: WO2011/131404
PCT Pub. Date: Oct. 27, 2011

(65) Prior Publication Data
US 2013/0040779 A1 Feb. 14, 2013

(30) Foreign Application Priority Data
Apr. 22, 2010 (DE) .......................... 10 2010 028 069

(51) Int. Cl.
*B60W 10/00* (2006.01)
*B60W 10/04* (2006.01)
*B60W 10/10* (2012.01)

(52) U.S. Cl.
USPC ................................ 477/107; 477/83; 477/70

(58) Field of Classification Search
USPC ............. 477/70, 79, 83, 107, 110; 701/54, 67
See application file for complete search history.

(56) References Cited

U.S. PATENT DOCUMENTS

| 6,519,522 B1 | 2/2003 | Wolf et al. |
| 6,692,406 B2 | 2/2004 | Beaty |

(Continued)

FOREIGN PATENT DOCUMENTS

| DE | 198 39 837 A1 | 3/2000 |
| DE | 101 39 122 A1 | 3/2002 |

(Continued)

OTHER PUBLICATIONS

German Search Report Corresponding to DE 10 2010 028 282.0.

(Continued)

*Primary Examiner* — Tisha Lewis
(74) *Attorney, Agent, or Firm* — Davis & Bujold, PLLC; Michael J. Bujold

(57) ABSTRACT

A gearshift control method for a motor vehicle whose drive train comprises a turbo-charged combustion engine, a startup clutch and a shift clutch and an automatic stepped transmission, in which drive engine torque deficiencies, that occur during the build-up of load at the end of a tractive upshift, are avoided without assisting the engine with an additional device or increasing the charge pressure. The method provides that the engine accelerates at the earliest, after the disengagement of the load gear, and at the latest, at the start of the load build-up after the engagement of the target gear up to the boost threshold speed or an engine speed which is slightly above the boost threshold speed, and is loaded, during the load build-up, with a largely constant engine speed beyond the intake torque of the engine to nearly the full load torque, before slipping of the friction clutch ends.

18 Claims, 3 Drawing Sheets

(56) References Cited

U.S. PATENT DOCUMENTS

| | | | |
|---|---|---|---|
| 6,846,269 B2 | 1/2005 | Reuschel et al. | |
| 6,953,410 B2 | 10/2005 | Wheeler et al. | |
| 7,220,215 B2 | 5/2007 | Eriksson et al. | |
| 7,534,192 B2 * | 5/2009 | Iwao et al. | 477/32 |
| 2005/0153815 A1 | 7/2005 | Janssen | |
| 2007/0142165 A1 | 6/2007 | Klinkner et al. | |
| 2010/0185370 A1 | 7/2010 | Wurthner et al. | |
| 2011/0237393 A1 | 9/2011 | Mair | |

FOREIGN PATENT DOCUMENTS

| | | |
|---|---|---|
| DE | 102 34 428 A1 | 2/2004 |
| DE | 103 30 951 A1 | 1/2005 |
| DE | 103 35 259 A1 | 2/2005 |
| DE | 10 2006 027 865 A1 | 12/2007 |
| DE | 10 2007 019 729 A1 | 10/2008 |
| DE | 10 2007 031 725 A1 | 1/2009 |
| DE | 10 2008 054 802 A1 | 6/2010 |
| EP | 1 070 625 A2 | 1/2001 |
| EP | 1 354 751 A2 | 10/2003 |

OTHER PUBLICATIONS

International Search Report Corresponding to PCT/EP2011/053109.
International Search Report Corresponding to PCT/EP2011/053113.
International Search Report Corresponding to PCT/EP2011/053112.
International Search Report Corresponding to PCT/EP2011/053114.
Written Opinion Corresponding to PCT/EP2011/053109.
Written Opinion Corresponding to PCT/EP2011/053113.
Written Opinion Corresponding to PCT/EP2011/053112.
Written Opinion Corresponding to PCT/EP2011/053114.

* cited by examiner

GEARSHIFT CONTROL METHOD FOR A MOTOR VEHICLE

This application is a National Stage completion of PCT/EP2011/053109 filed Mar. 2, 2011, which claims priority from German patent application serial no. 10 2010 028 069.0 filed Apr. 22, 2010.

FIELD OF THE INVENTION

The invention relates to a gearshift control method for a motor vehicle whose drive train comprises a drive engine which is built as a turbo-charged internal combustion engine, a startup clutch and a shift clutch built as an automatic friction clutch and a gearbox built as an automatic stepped transmission, wherein torque deficiency of the drive engine which occurs during the build-up of load at the end of a tractive upshift is avoided.

BACKGROUND OF THE INVENTION

In motor vehicles, there has been increasing use of automatic stepped transmissions with an automatic friction clutch as a startup and shift clutch, in which the gear selection, the triggering of shift operations, the engaging and disengaging of gear steps and the engaging and disengaging of the friction clutch are automated; that is, these operations occur by evaluating operating parameters in a transmission control device and the drive assigned to the control.

Particularly in the case of commercial vehicles, the drive engines are usually designed as turbo-charged diesel engines, which have a specific load build-up characteristic. The document DE 10 2008 054 802.2, which was not pre-published, discloses a method for controlling an automatic stepped transmission depending on the dynamic operating characteristics of a turbo-charged internal combustion engine, and describes in detail that a turbo-charged internal combustion engine can spontaneously, that is with high torque gradients, only reach an intake torque lying below the full load torque. A further increase of the engine torque is briefly possible, although with low torque gradients, only above a boost threshold speed, after which the turbo-charger creates a significant increase of the charge pressure and thus the engine torque.

Thus aside from the idle speed, cut-off speed and the full load torque characteristic curve, the dynamic behavior of a turbo-charged internal combustion engine is also determined by the boost threshold speed and the intake torque characteristic curve as well as by the present torque gradients, at least in certain regions. For turbo-charged internal combustion engines below the boost threshold speed, due to the limitation of the spontaneously achievable engine torque to the intake torque, significant torque deficiency that is generally referred to as turbo lag, is observed, which can occur for example during load build-up at the end of a tractive upshift, when the coupling speed of the target gear lies below the boost threshold speed of the drive engine.

Such torque deficiency of the drive engine occurs during a tractive upshift, particularly at high drive resistance and high engine loads, e.g., during uphill travel on steep road inclines, with high loads or on difficult terrain (off-road travel). Under these operating conditions, the coupling speed of the target gear, determined by the transmission ratio step of the upshift, can be reduced so far that the coupling speed lies below the boost threshold speed of the drive engine. Consequently, the drive engine during load build-up at the end of the tractive upshift can then spontaneously generate and produce only the intake torque thereof which can however lie below the actual drive resistance (rolling resistance+incline resistance+wind resistance). In this case, it is therefore no longer possible to continue travel at a constant travel speed or with vehicle acceleration corresponding to the gas pedal position.

It is then typically necessary to downshift or even to startup from a standstill in order to avoid lowering the speed of the drive engine below the idle speed and subsequently stalling the drive engine. However, this significantly disrupts the desired travel activity, and from the perspective of the driver is considered mostly inconvenient.

The shift strategy of an automatic stepped transmission, that is the shift characteristic lines and shift characteristics fields of the transmission control, is typically designed such that under certain operating conditions, tractive upshift does not occur for automatically triggered shifting, and is not possible for manually triggered shifting. It is possible with a tractive upshift, however, that such an operating situation with torque deficiency of the drive engine arises due a disruption.

Thus, the tractive-free phase of shifting can be quite prolonged due to problems internal to the transmission, because with the use of synchronized clutches, for instance, the synchronization of the target gear is delayed due to strong wear of the assigned friction synchronization, or with the use of unsynchronized clutches, the engagement of the target gear is delayed due to a tooth-on-tooth position of the clutch halves. Likewise, the drive resistance can increase significantly during the tractive-free phase of the tractive upshift, for example, due to transitioning to a roadway section with a significantly higher incline. Consequently, the travel speed of the vehicle decreases more strongly during the shift-dependent interruption of the tractive force than provided for in shifting characteristics lines and shifting characteristic fields of the transmission control.

It is also possible however, that such an operating state is caused intentionally with certain emergency vehicles or with certain emergency travel, in that an atypical tractive upshift starting from high engine speed is performed with an unusually large gear increment, that is, with an increased transmission ratio step. This way, acceleration to an intended target speed in the respective target gear is intended to be performed, that is without further tractive upshifts and the interruptions in tractive force associated with the upshifts. This relates to airport fire engines, for example, which must reach their respective site of action as quickly as possible, thus with the greatest possible acceleration. With the use of a turbo-charged internal combustion engine, the greatest possible gear increment that can be used for this purpose is limited however, by the load build-up characteristic of the drive engine because reaching the emergency site would be greatly delayed with the occurrence of temporary torque deficiency of the drive engine.

Numerous devices and methods for the use thereof have been disclosed for avoiding, or at least reducing, the undesired turbo lag. Thus, for example, an adjustable turbine geometry for improving the response behavior of the exhaust gas turbo-charger, a boost drive for supporting the internal combustion engine at high engine load, or additional devices for increasing the charging pressure at low engine speeds, such as a mechanically driven compressor, an electrically driven booster compressor, a mechanical or electrical drive of the drive shaft of the exhaust gas turbo-charger, or a compressed air supply device for generating and feeding compressed air into the intake and exhaust gas tract of the internal combustion engine.

Thus the document U.S. Pat. No. 6,692,406 B2 describes a gearshift control method for a motor vehicle provided with a turbo-charged internal combustion engine, an automatic friction clutch and an automatic transmission, according to which, with a full load upshift, the internal combustion engine is controlled such that the charge pressure during the shift procedure is maintained either by an increase of the exhaust gas energy or by maintaining the rotational speed of the exhaust gas turbo-charger, whereby sufficiently high engine torque can be built up at the load build-up at the end of the tractive upshift. For this purpose, among others, there can be a suitable adjustment of the turbo blades of a turbo-charger with variable turbine geometry (VTG).

A method for operating a drive train is known from the document DE 103 35 259 A1 in which, in particular, a turbo-charged internal combustion engine is driven during startup and shift operations in order to compensate the torque deficiency thereof by an electrical boost drive, whereby the engine speed of the internal combustion engine is increased more quickly in each case, and the slipping phase of the friction clutch is shorter.

Finally, the document DE 10 2006 027 865 A1 discloses a method for regulating charge pressure of a turbo-charged internal combustion engine, according to which, with a load build-up during a tractive upshift, compressed air from a compressed air supply device before the turbine of the exhaust gas turbo-charger is fed into the exhaust gas tract of the internal combustion engine, whereby the compressor of the exhaust gas turbo-charger is strongly accelerated by the turbine and thus generates an increased charge pressure.

Such additional devices are, however, relatively complex and expensive, increase the construction space requirements and represent increased failure potential for the operation of the internal combustion engine, so that they are frequently omitted.

SUMMARY OF THE INVENTION

Therefore, the problem addressed by the invention is to propose a method for gearshift control of a motor vehicle of the initially named type, with which torque deficiency of the drive engine occurring during load build-up at the end of a tractive upshift can be avoided without reverting to an additional device for the purpose of supporting the drive engine or for increasing the charge pressure.

This problem is solved with a gearshift control method, in that the drive engine accelerates at the earliest after the disengagement of the load gear and at the latest at the start of the build-up of load after the engagement of the target gear, up to the boost threshold speed $n_{L\_min}$ or an engine speed $n_M$ which is slightly above the boost threshold speed $n_{L\_min}$, thus ($n_M = n_{L\_min}$; $n_{L\_min} + \Delta n_M$), and is loaded during the build-up of load with a largely constant engine speed ($n_M \approx n_{L\_min}$) beyond the intake torque $M_S$ of the drive engine to nearly the full load torque $M_{VL}(n_{L\_min})$ before the slipping operation of the friction clutch ends.

Accordingly, the invention assumes a known motor vehicle, a commercial vehicle for example, the drive train of which comprises a drive engine built as a turbo-charged internal combustion engine, a drive element built as an automatic friction clutch and a transmission built as an automatic stepped transmission. With such a motor vehicle, torque deficiency of the drive engine can occur at the load build-up at the end of a tractive upshift, which manifests itself in that the maximum torque $M_{max}$ that can be spontaneously generated by the drive engine is not sufficient for travel to continue in the engaged target gear with travel acceleration corresponding to the requested power by the driver specified by the gas pedal position or at least with constant travel speed.

In order to avoid such torque deficiency of the drive engine without a downshift or a startup from standstill, the method according to the invention provides that the drive engine is accelerated during the shift-dependent interruption of tractive force, that its, at the earliest after the disengagement of the load gear and no later than the start of the load build-up after engaging the target gear initially up to the boost threshold speed $n_{L\_min}$ or an engine speed $n_M$ lying slightly above the boost threshold speed $n_{L\_min}$, thus ($n_M = n_{L\_min}$; $n_M = n_{L\_min} + \Delta n_M$), from which the exhaust gas turbo-charger can build-up a higher charge pressure and with it, the drive engine can build-up a higher engine torque $M_M$ lying above the intake torque $M_S$. The subsequent load build-up occurs then due to a coordinated engagement of the friction clutch and an increase of the engine power of the drive engine with largely constant engine speed ($n_M \approx n_{L\_min}$) beyond the intake torque $M_S$ of the drive engine up to nearly the full load torque $M_{VL}(n_{L\_min})$, before ending the slipping operation of the friction clutch.

An optionally provided speed increase $\Delta n_M$ from approximately 50 min$^{-1}$ up to 100 min$^{-1}$ above the boost threshold speed $n_{L\_min}$ serves as a control reserve to compensate for signal inaccuracies and disruptions, by means of which a decrease of the engine speed $n_M$ below the boost threshold speed $n_{L\_min}$ and a consequently caused reduction of the engine toque $M_M$ to the intake torque $M_S$ can be avoided.

Thus, depending on the dynamic operating characteristics of the drive engine, higher engine torque ($M_M = M_{VL}(n_{L\_min})$) is available with which torque deficiency of the drive engine is avoided, and which is sufficient in most cases to continue travel without a downshift or a startup from standstill.

However, because the method process according to the invention has a prolonged slipping phase of the friction clutch as compared to a normal upshift process, the friction clutch is subject to increased mechanical and thermal loading. Consequently, the method according to the invention for gearshift control should be implemented only under certain operating conditions, that is, as a special method.

The data which represents the dynamic operating characteristics of the internal combustion engine can be taken either directly from the engine control device, or from a data store of the transmission control device. As already described in the document DE 10 2008 054 802.2, the relevant data that corresponds to the vehicle configuration can be transferred to the data store of the transmission control device at the end of the production line of the motor vehicle, and during later travel operation, can be adapted through a comparison with the current operating data, for example of the drive engine, that is, adapted to the changed operating characteristics. By accessing such updated data, the present procedure for the vehicle control is automatically adapted to the changed operating characteristics of the motor vehicle or of the drive engine.

With respect to ending the slipping operation of the friction clutch, there are basically three possible variants that differ from each other with respect to travel comfort, mechanical and thermal loading of the friction clutch and the ultimately attainable engine torque $M_M$.

In a first variant of the method, the drive engine is held at the present engine speed, thus at the boost threshold speed or a speed lying slightly above the boost threshold speed ($n_M = n_{L\_min}$; $n_M = n_{L\_min} + \Delta n_M$), and the present engine torque ($M_M \approx M_{VL}(n_{L\_min})$), and the friction clutch is held at the present degree of disengagement until the friction clutch is adjusted to run synchronously ($n_M = n_{GE}$), and the friction clutch is then completely engaged. This variant of the method has the advantage of simple control and largely smooth and thus comfortable torque progression. However, the slipping phase of the friction clutch is comparatively long and thus the loading on the friction clutch is relatively high.

This method variant, in which the drive engine is held at the present engine speed ($n_M = n_{L\_min}$; $n_M = n_{L\_min} + \Delta n_M$) and present engine torque ($M_M \approx M_{VL}(n_{L\_min})$) until the friction clutch is completely engaged, is preferably used when the present engine torque $M_{VL}(n_{L\_min})$ largely corresponds to the present target torque $M_{soll}$ of the drive engine, thus ($M_{VL}(n_{L\_min}) \approx M_{soll}$).

The target torque $M_{soll}$ of the drive engine is specified by the driver via the gas pedal position and corresponds mostly to the drive resistance torque $M_{FW}$, which is given by the sum of the motor vehicle drive resistances such as the rolling resistance, incline resistance and wind resistance, by back calculation with the overall transmission ratio and the efficiency of the drive train on the input shaft of the stepped transmission. If the driver wishes to maintain the present travel speed, the target torque $M_{soll}$ therefore corresponds exactly to the drive resistance torque $M_{FW}$, thus ($M_{soll} = M_{FW}$). However, if the driver wishes to accelerate, the target torque $M_{soll}$ lies above the drive resistance torque $M_{FW}$ by an appropriate acceleration torque $M_{Acc}$, thus ($M_{soll} = M_{FW} + M_{Acc}$)

In contrast, according to a second variant of the method, the engine speed $n_M$ is lowered, by further engagement of the friction clutch and/or by intervention in the engine control, to the transmission input speed $n_{GE}$, thus ($n_M = n_{GE}$, $n_M < n_{L\_min}$), and then the friction clutch is completely engaged. This method variant has the advantage of a shortened slipping phase, and thus reduced loading of the friction clutch. The transition of the friction clutch from the slipping operation into the engaged operation however, is perceived as an uncomfortable jolt.

The intended reduction of the engine speed $n_M$ below the boost threshold speed $n_{L\_min}$ should only occur when the charge pressure $p_L$ of the drive engine has exceeded a boost threshold value $p_{L\_min}$, thus ($p_L > p_{L\_min}$), characterizing the exhaust gas turbo-charger, for a charge pressure build-up, and when the increased engine torque ($M_M = M_{VL}(n_{L\_min})$ is stable, because otherwise the engine torque $M_M$ can undesirably decrease to the intake torque $M_S$.

In general, the most recently described method variant with a reduction in the engine speed $n_M$ below the boost threshold speed $n_{L\_min}$ should only be used when the present engine torque $M_{VL}(n_{L\_min})$ lies significantly above the target torque $M_{soll}$ of the drive engine, thus ($M_{VL}(n_{L\_min}) >> M_{soll}$), and when the engine torque $M_{VL}(n_M)$ at the reduced engine speed has at least not fallen below the drive resistance torque ($n_M < n_{L\_min}$), thus ($M_{VL}(n_M) \geq M_{FW}$).

In a third variant of the method, the drive engine is set to a higher engine speed ($n_M > n_{L\_min}$) and a higher engine torque ($M_M > M_{VL}(n_{L\_min})$) by increasing the engine power and a further engagement of the friction clutch, and held there until the friction clutch runs synchronously ($n_M = n_{GE}$), and then the friction clutch is engaged completely. This method variant, along with having the advantage of being extensively smooth and thus comfortable, also has a significantly prolonged slipping phase and thus increased loading of the friction clutch.

Therefore, this method variant in which the engine speed $n_M$ is increased above the boost threshold speed $n_{L\_min}$, is preferably used only when the present engine torque $M_{VL}(n_{L\_min})$ lies significantly below the target torque $M_{soll}$ of the drive engine thus ($M_{VL}(n_{L\_min}) << M_{soll}$), and when the engine torque $M_{VL}(n_M)$ at the increased engine speed ($n_M < n_{L\_min}$) has not fallen below at least the drive resistance torque $M_{FW}$, thus ($M_{VL}(n_m) \geq M_{FW}$).

Different criteria can be evaluated alone or in combination with each other in order to detect an existing or immediately impending torque deficiency of the drive engine, and thus in order to trigger the method according to the invention.

Thus, an existing or immediately impending torque deficiency of the drive engine can be detected in that the engine speed $n_M$ during the shift-dependent interruption of the tractive force has fallen below the boost threshold speed $n_{L\_min}$ of the drive engine, thus ($n_M < n_{L\_min}$), and that after completion of the upshift the drive resistance torque $M_{FW}$ lies above the intake torque $M_S$ of the drive engine, thus ($M_{FW} > M_S$). The drive engine is then no longer capable of spontaneously generating an engine torque $M_M$ lying above the intake torque $M_S$ that would be necessary in order to continue traveling at least with constant travel speed.

Likewise an existing or immanent torque deficiency of the drive engine can be detected in that the coupling speed $n_{Ziel}$ of the current upshift lies below the boost threshold speed $n_{L\_min}$ of the drive engine, thus ($n_{Ziel} < n_{L\_min}$), and that the drive resistance torque $M_{FW}$ after completing the upshift lies above the intake torque $M_S$ of the drive engine, thus ($M_{soll} > M_S$). If the coupling speed $n_{Ziel}$ of the upshift lies below the boost threshold speed $n_{L\_min}$, the drive engine is forced by the engaging of the friction clutch with greater probability below the boost threshold speed $n_{L\_min}$ even if the engine speed $n_M$ lies above the boost threshold speed before the load build-up.

An existing or immanent torque deficiency of the drive engine can also be detected in that the charge pressure $p_L$ of the drive engine during the shift-dependent interruption of tractive force has fallen below the boost threshold value $p_{L\_min}$, thus ($p_L < p_{L\_min}$), and that the drive resistance torque $M_{FW}$ after conclusion of the upshift lies above the intake torque $M_S$ of the drive engine, thus ($M_{FW} > M_S$).

In addition, it is reasonable to make performing the method dependent on certain operation-specific, vehicle-specific, environmental-specific and/or use-specific criteria.

Thus it is expedient to continuously determine the current target torque $M_{soll}$ of the drive engine, and then to prematurely transition to the normal shift control or drive control, that is, to terminate the control method according to the invention when the present target torque $M_{soll}$ has attained or has fallen below the intake torque $M_S$ of the drive engine, thus ($M_{soll} \leq M_S$). A reduction of the target torque $M_{soll}$ occur in that the driver during the method procedure, that is during the tractive upshift, reduces the gas pedal position because he wants to slow down the motor vehicle, or because the drive resistance is lowered due to transitioning to a roadway section with a lower incline, but the driver does not want the motor vehicle to accelerate.

In particular with the first and the third method variants, the mechanical and thermal load of the friction clutch is relatively high due to the long slipping phase and can therefore exceed the permissible load limits. Therefore it is sensible to continuously determine the thermal and/or mechanical load of the friction clutch, and then to prematurely transition to the normal shift control or drive control, that is, to terminate the control method according to the invention, when the present loading of the friction clutch attains or has exceeded a predetermined load limit value. The thermal loading state of the friction clutch can be detected, for example in the form of a sensor recorded clutch temperature, which for the decision is compared to the predetermined temperature limit value. Preferably however, the thermal energy created in the friction clutch in slip operation is calculated, and the amount thereof is compared to a predetermined thermal energy limit value for the decision.

In order to avoid overloading and damaging the friction clutch, it is even better, however, if the thermal and/or mechanical load of the friction clutch caused by the gearshift control according to the invention is determined ahead of time, that is, before starting the control method, and that the method according to the invention is performed only when the load of the friction clutch is not expected to attain or exceed a predetermined load limit value. Based on the intended speed and torque progressions of the drive engine and the speed progression of the input shaft of the staged transmission during the upshift, the relevant slipping speed and the frictional power, and thus the thermal and mechanical total load of the friction clutch can be predicted relatively accurately.

Likewise, it is expedient to determine ahead of time the maximum torque $M_{max}$ of the drive engine that can be attained using the gearshift control according to the invention, and then to perform the method according to the invention only when the attainable maximum torque $M_{max}$ at least does not fall below the present drive resistance torque $M_{FW}$, thus ($M_{max} \geq M_{FW}$). If this condition is not fulfilled, it does not make sense to perform the control method because then the motor vehicle would be decelerated, and accordingly a downshift or a startup from standstill is unavoidable anyway.

A further criterion for activating the method according to the invention can be that the drive control according to the invention is performed only when the gas pedal setting has attained or exceeded a predetermined limit setting. This limit setting of the gas pedal can for instance, be the kick-down setting with which a downshift is typically triggered. With this criterion it is guaranteed that the drive control according to the invention is activated only upon high power requests by the driver.

Beyond that, it can be provided that the drive control, according to the invention, is performed only when this is released or activated as a vehicle-specific or use-specific special function. Thus, it is possible for example that the drive control according to the invention is available or released only for specific emergency vehicles, such as fire trucks, ambulances, and military vehicles, or can be enabled only for specific uses, such as off-road travel, but is not available or blocked during normal drive operation in standard vehicles.

BRIEF DESCRIPTION OF THE DRAWINGS

For illustrating the invention, the description is accompanied by a drawing with an example embodiment. The figures show.

DETAILED DESCRIPTION OF THE PREFERRED EMBODIMENTS

A presently given drive train of a commercial vehicle comprises a drive engine designed as a turbo-charged internal combustion engine, a startup clutch and clutch designed as automated friction clutches, and a transmission designed as an automatic stepped transmission. The stepped transmission can be connected on the input side, via a friction clutch, to the drive shaft (crankshaft) of the internal combustion engine, and on the output side, via a cardan shaft, to the axle transmission (axle differential) of the drive axle.

At least one auxiliary consumer and optionally, at least one drive-side power take-off, are disposed at the internal combustion engine, which in the driven state, reduce the engine torque $M_M$ of the internal combustion engine that can be delivered at the friction clutch and that is available for driving the motor vehicle. In addition, further output drive side power take-offs can be disposed at the stepped transmission or at the axle transmission, which in the activated state further reduce the engine torque $M_M$ transmitted, via the friction clutch, to the stepped transmission, such that in drive operation a correspondingly reduced torque is available for overcoming the drive resistance and attaining at least minimal vehicle acceleration.

In drive operation, the internal combustion engine must therefore be able to generate engine torque $M_M$ and deliver the torque at the friction clutch so that such torque, minus the drive torque for the auxiliary consumers and the output drive side power take-offs, is sufficient for attaining acceptable vehicle acceleration. For this purpose, the engine torque $M_M$ transferred by the friction clutch must be high enough that, even minus the drive torques for the output drive side power take-off drives, the engine torque far exceeds the drive resistance torque, resulting from the present drive resistance, that is, with the overall transmission ratio and the efficiency of the drive train at the input shaft of the stepped transmission, the excess torque exceeds the drive resistance torque $M_{FW}$ to such a degree that the excess torque is sufficient at least for a minimal vehicle acceleration.

The present invention proposes a method with which torque deficiency of the drive engine occurring during load build-up at the end of the tractive upshift is avoided without resorting to an additional device for assisting the drive engine or to increasing the charge pressure.

Figure 4:
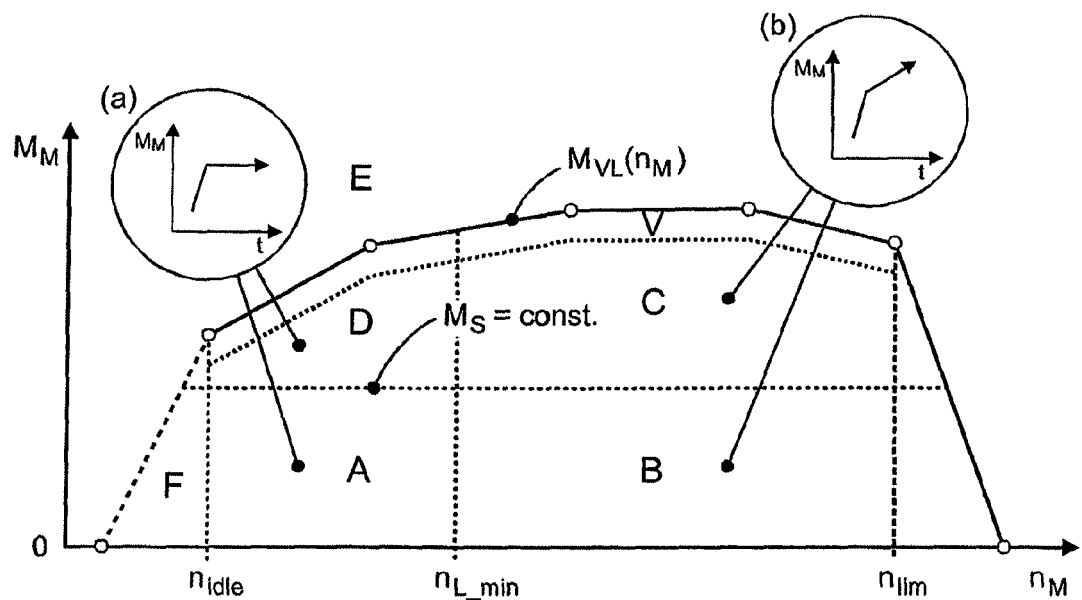

For this purpose, the important dynamic operating characteristics of the drive engine built as a turbo-charged internal combustion engine, which can be taken from the engine dynamic characteristic map known from the document DE 10 2008 054 802.2, can be stored in the data store of the transmission control device and are shown for example in FIG. 4.

The engine dynamic characteristic map represented in the torque/speed diagram in FIG. 4 contains the spontaneously available maximum torque $M_{max}$ of the internal combustion engine and the maximum torque gradient $(dM_M/dt)_{max}$, with which the immediately available maximum torque $M_{max}$ of the internal combustion engine can be attained, in each case, as a function of the present engine torque $M_M$ and the present engine speed $n_M$, thus $(M_{max}=f(M_M, n_M), (d M_M/d t)_{max}=f(M_M, n_M))$. The engine dynamic characteristic map is bounded by the stationary full load torque characteristic curve $M_{VL}(n_M)$, the zero torque curve ($M_M=0$), the idle speed $n_{idle}$ and the cut-off speed $n_{lim}$ of the internal combustion engine. The engine dynamic characteristic map is subdivided into four operating regions A, B, C, D by the intake torque characteristic curve $M_S(n_M)$ of the intake torque, simplified here as assumed to be constant $M_S$=const., and the boost threshold speed $n_{L\_min}$ of the internal combustion engine.

In the first region A ($0 \leq M_M < M_S$, $n_{idle} \leq n_M < n_{L\_min}$) that is below the intake torque characteristic curve $M_S$=const. and below the boost threshold speed $n_{L\_min}$, the immediately available maximum torque $M_{max}(n_M)$ of the internal combustion engine is formed, in each case, by the corresponding value of the intake torque $M_S$; thus ($M_{max}(n_M)=M_S$). However, as the intake torque $M_S$ in this region is constant ($M_S$=const.), the immediately available maximum torque $M_{max}$ of the internal combustion engine is represented by a single value ($M_{max}=M_S$=const.). Independent of this, the very high maximum torque gradient $(dM_M/dt)_{max}$ in operating region A can also be represented by a single value.

In the second region B ($0 \leq M_M < M_S$, $n_{L\_min} \leq n_M \leq n_{lim}$) lying below the intake torque characteristic curve $M_S$=const. and above the boost threshold speed $n_{L\_min}$, the immediately available maximum torque $M_{max}(n_M)$ of the internal combustion engine is similarly given in each case by the corresponding value of the intake torque $M_S$. Because the intake torque $M_S$ in this region has a constant progression ($M_S$=const.), the immediately available maximum torque $M_{max}$ of the internal combustion engine is represented by a single value ($M_{max}=M_S$=const.) also in the region B. As with region A, also in region B, the maximum torque gradient $(dM_M/dt)_{max}$ that is also very high beneath the intake torque characteristic curve $M_S$=const. can also be expressed by a single value.

In the third region C ($M_S \leq M_M < M_{VL}(n_m)$, $n_{L\_min} \leq n_M \leq n_{lim}$), adjacent to region B, and lying above the intake torque characteristic curve $M_S$=const. and above the boost threshold speed $n_{L\_min}$, a further increase of the engine torque $M_M$ is possible up to the respective value of the stationary full load torque characteristic curve $M_{VL}(n_M)$, however, with a significantly lower maximum torque gradient $(dM_M/dt)_{max}$ than in the regions A and B, i.e., below the intake torque characteristic curve $M_S$=const.

In the fourth region D ($M_S \leq M_M < M_{VL}(n_M)$, $n_{idle} \leq n_M < n_{L\_min}$), adjoining at the first region A, above the intake torque characteristic curve $M_S$=const. and below the boost threshold speed $n_{L\_min}$, a further rapid increase of the engine torque $M_M$ is not possible without an increase of the engine speed $n_M$ above the boost threshold speed $n_{L\_min}$. Consequently, in operating region D, the immediately available maximum torque $M_{max}(n_M)$ of the internal combustion engine equals the corresponding value of the intake torque $M_S$ ($M_{max}(n_M)=M_S$=const.) and the maximum torque gradient $(dM_M/dt)_{max}$ equals zero, thus $((dM_M/dt)_{max}=0)$.

An operating region E, which cannot be attained in normal driving operation and thus is not relevant, can be defined above the full load torque characteristic curve $M_{VL}(n_M)$. Below the full load torque characteristic curve $M_{VL}(n_M)$ and the idle speed $n_{idle}$, there is an undesirable but technically attainable operating region F, into which the internal combustion engine can be pushed dynamically from an engine speed $n_M$ lying near the idle speed $n_{idle}$, for example due to a rapid engagement of the friction clutch, and in which there is a danger of stalling the internal combustion engine.

In addition, a nearby region lying immediately below the full load torque characteristic curve $M_{VL}(n_M)$ can be defined as an additional operating region V, in which the internal combustion engine under full load, that is along the full load torque characteristic curve $M_{VL}(n_M)$, can be pushed to a lower engine speed $n_M$ or controlled to higher engine speed $n_M$.

For the tractive upshifts considered here, in which the drive engine is to be guided from an engine speed $n_M$ lying below the boost threshold speed $n_{L\_min}$ to an engine speed $n_M$ lying above the boost threshold speed $n_{L\_min}$, and from an engine torque $M_M$ lying below the intake torque $M_S$ to an engine torque $M_M$ lying above the intake torque $M_S$, it is to be noted accordingly that the drive engine can be spontaneously loaded, that is with higher torque gradients $dM_M/dt$ only up to the intake torque $M_S$ when the engine speed $n_M$ remains below the boost threshold speed $n_{L\_min}$.

Figure 5A:
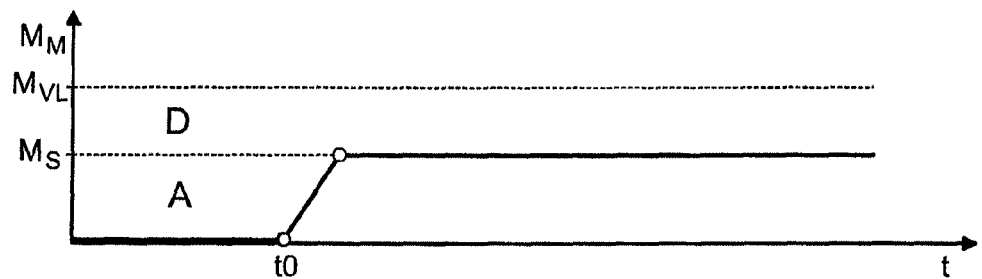
Figure 5B:
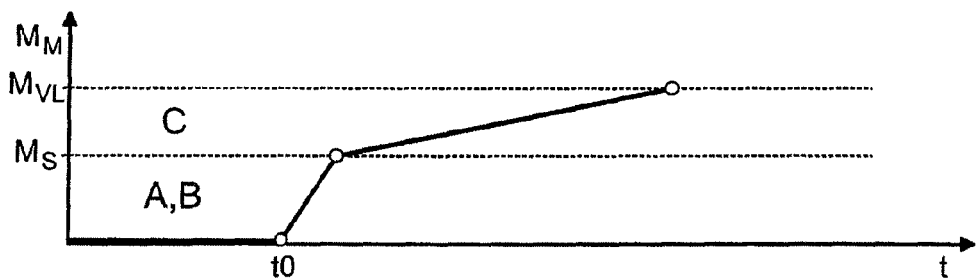

This relationship is represented greatly simplified in the torque progression $M_M(t)$ in the image insert (a) of FIG. 4 and in the time progression of FIG. 5a. Likewise it is to be noted for the present drive control that the drive engine must be accelerated above the boost threshold speed $n_{L\_min}$ for the immediate setting of an engine torque $M_M$ lying above the intake torque $M_S$, that is, it must be controlled from the operating region A into the operating region B, because a further rapid increase of the engine torque $M_M$ is possible only above the boost threshold speed $n_{L\_min}$, even with lower torque gradients $dM_M/dt$. This relationship is illustrated in a greatly simplified manner in the torque progression $M_M(t)$ in the image insert (b) of FIG. 4 and in the time progression of FIG. 5b.

In the present method for gearshift control according to the invention, possible torque deficiency of the drive engine during load build-up at the end of a tractive upshift, depending on the dynamic operating characteristics thereof, is avoided in that the drive engine is accelerated up to the boost threshold speed $n_{L\_min}$ or an engine speed $n_M$ which is slightly above the boost threshold speed, thus $n_M \approx n_{L\_min}$ ($n_M = n_{L\_min}$; $n_M = n_{L\_min} + \Delta n_M$), at the earliest after the disengagement of the load gear and at the latest at the start of the build-up of load after the engagement of the target gear, and is loaded during the build-up of load at a largely constant engine speed ($n_M \approx n_{L\_min}$) beyond the intake torque $M_S$ of the drive engine to nearly the full load torque $M_{VL}(n_{L\_min})$ before the slipping operation of the friction clutch is ended.

Figure 1:
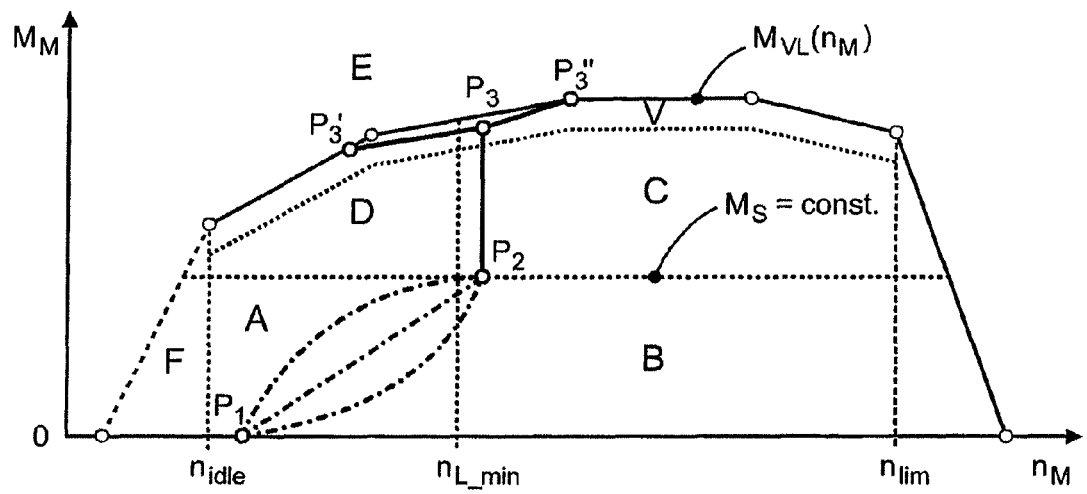
FIG. 1 an engine characteristic curve with torque progressions for avoiding torque deficiency with a tractive upshift of a turbo-charged internal combustion engine, FIG. 2 relevant speed and torque progressions with a tractive upshift using the gearshift control according to the invention, FIG. 3 relevant speed and torque progressions with a tractive upshift without the gearshift control according to the invention, FIG. 4 an engine dynamic characteristic curve of a turbo-charged internal combustion engine, FIG. 5a the torque build-up of an internal combustion engine according to FIG. 4 with an engine speed controlled below the boost threshold speed, and FIG. 5b the torque build-up of an internal combustion engine according to FIG. 4 with an engine speed controlled above the boost threshold speed.
Figure 2:
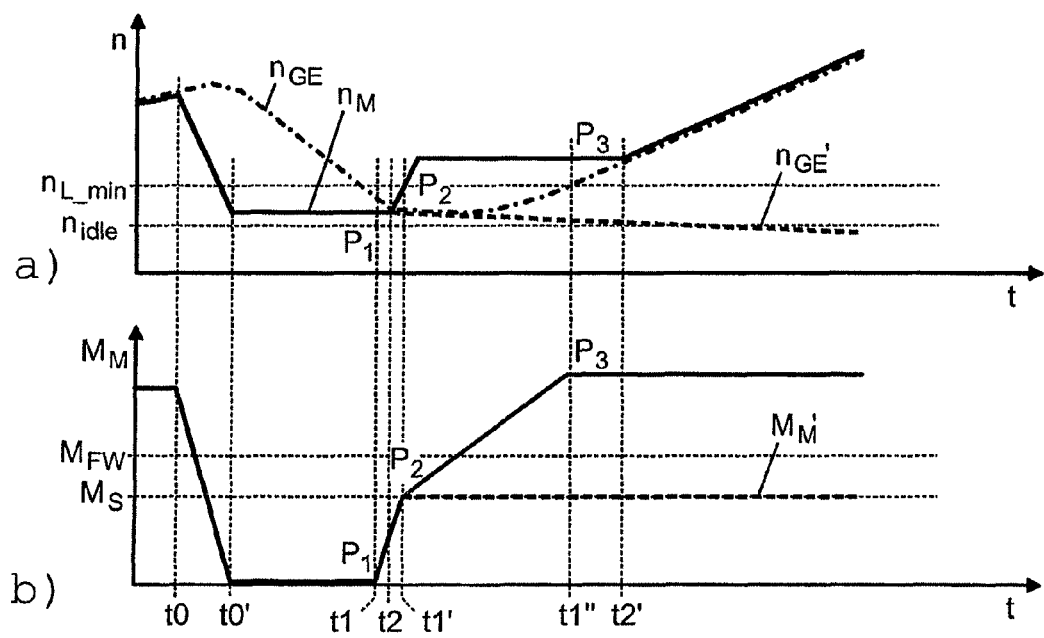
Figure 3:
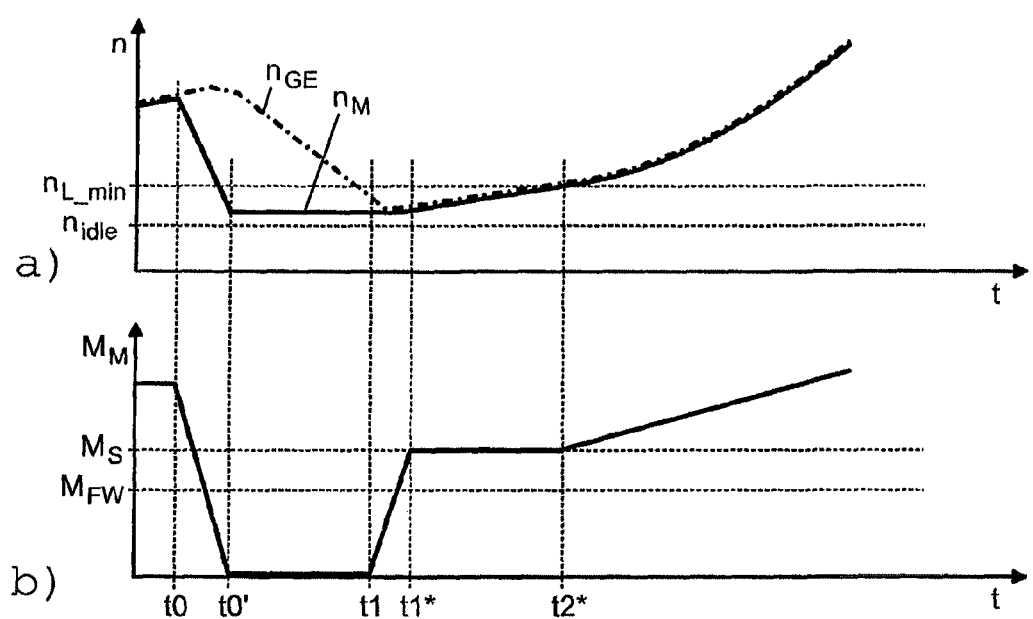

Three variants of a corresponding speed control and torque control of the internal combustion engine are represented in FIG. 1 in an engine dynamic characteristic map according to FIG. 4. For a first variant of the gearshift control method according to the invention, FIG. 2 shows the respective time progressions of the engine speed $n_M$, the transmission input speed $n_{GE}$ and the engine torque $M_M$. FIG. 3 in contrast shows the corresponding speed progression and torque progression for a tractive upshift in which the control method according to the invention is not used.

As seen in the time progressions in FIG. 2, a triggered tractive upshift begins at time t0, in that, overlapping in time, the friction clutch disengages and the engine torque $M_M$ provided by the drive engine is reduced. As a result, the engine speed $n_M$ decreases until to time t0', at present for example, up to nearly the idle speed $n_{idle}$ and the engine torque $M_M$ to nearly the idle torque ($M_{idle} \approx 0$). Then, the load gear is disengaged to a large extent load-free, and subsequently the higher target gear is synchronized and engaged. Next, starting from time t1 (operating point P1), the load built up of the drive engine occurs, as is also shown in FIG. 1, by increasing the engine power and a coordinated engagement of the friction clutch.

Because the present transmission input speed $n_{GE}$ lies below the boost limit speed $n_{L\_min}$, and the present drive resistance torque $M_{FW}$ lies above the intake torque $M_S$ of the drive engine, the gearshift control method according to the invention is started. Consequently, from time t2 the drive engine accelerates up to an engine speed $n_M$ lying slightly over the boost threshold speed $n_{L\_min}$, thus ($n_M = n_{L\_min} + \Delta n_M$), so that the engine can build-up engine torque $M_M$ that lies above the intake torque $M_S$ attained at time t1' (operating point P2).

The further load build-up occurs at largely constant engine speed ($n_M \approx n_{L\_min}$) via the intake torque $M_S$ of the drive engine to nearly the full load torque $M_{VL}(n_{L\_min})$, which is attained at time t1" (operating point P3). With previously exceeding the drive resistance torque $M_{FW}$, the motor vehicle and thus the input shaft of the stepped transmission are accelerated (see transmission inputs speed $n_{GE}$).

If the method according to the invention was not used in this case, but rather after engaging the target gear, the friction clutch would be engaged completely, then the drive engine could immediately attain only the intake torque $M_S$ thereof, and this would initially be maintained (see the torque progression $M_M'$ in FIG. 2b). The consequence would be a deceleration of the motor vehicle (see engine speed progression $n_{GE}'$ in FIG. 2a), which could lead to a downshift or a startup from standstill.

The three curve progressions in FIG. 1 between the operating points $P_1$ and $P_2$ are to illustrate that the speed control and torque control in this region can occur arbitrarily. For accelerating the shift procedure, however the control progression with the fastest possible attainment of the operating point $P_2$ is to be preferred.

In the first method variant represented in FIG. 1 and FIG. 2, the drive engine is held at the present engine speed ($n_M = n_{L\_min} + \Delta n_M$) and at the present engine torque ($M_M \approx M_{VL}(n_{L\_min})$) and the friction clutch is held to the present degree of disengagement until the friction clutch is synchronized ($n_M = n_{GE}$) due to the acceleration of the motor vehicle, before the friction clutch is engaged completely (time t2').

In one relatively uncomfortable second method variant only represented in FIG. 1, in which the friction clutch is less strongly loaded, however, the engine speed $n_M$ is reduced to the transmission input speed $n_{GE}$, thus ($n_M = n_{GE}, n_M < n_{L\_min}$), by further engaging of the friction clutch and/or by an intervention in the engine control, before the friction clutch is completely engaged (operating point $P_3'$). As a consequence, the engine torque $M_M$ is slightly reduced ($M_M < M_{VL}$ (nL_min)) and the engine speed $n_M$ decreases ($n_M < n_{L\_min}$) below the boost limit speed $n_{L\_min}$. There is no danger of a downshift of the engine torque $M_M$ to the intake torque $M_S$.

In a relatively comfortable third method variant, likewise only represented in FIG. 1, in which the friction clutch is however more highly loaded, by increasing the engine power and further engaging the friction clutch, the drive engine is set (operating point $P_3''$) to a higher engine speed ($n_M > n_{L\_min}$) and a higher engine torque ($M_M > M_{VL}(n_{L\_min})$), and held there until the friction clutch runs synchronously ($n_M = n_{GE}$) due to the acceleration of the motor vehicle, before the friction clutch is completely engaged.

Because the method according to the invention in all method variants, results in increased loading of the friction clutch compared to normal shift progressions, the method should be used as a special function only in urgent need, e.g. in the event of extremely high performance demands by the driver, for specific emergency vehicles such as fire engines or ambulances, or in the emergency use of motor vehicles.

If, with a tractive upshift, the present drive resistance torque $M_{FW}$ lies below the intake torque $M_S$ of the drive engine, that is, at least minimal vehicle acceleration is possible anyway, the present invention should not be used, even if the driver using the gas pedal setting requests a higher engine torque $M_M$ or a faster vehicle acceleration.

The speed progressions and the torque progressions of a corresponding tractive upshift are shown for example in FIG. 3. In this case, the load build-up of the drive engine occurs from time t1 only until attaining the intake torque $M_S$ (time t1*). Because with the preceding exceeding of the drive resistance torque $M_{FW}$, the motor vehicle already accelerates, the boost threshold speed $n_{L\_min}$ is attained relatively quickly (time t2*). The further travel of the motor vehicle occurs then with increasing acceleration because the engine torque $M_M$ increases beyond the intake torque $M_S$ due to the increasing charge pressure $p_L$. In this case, it is not absolutely necessary to use the method according to the invention, and therefore it should not be used in order to spare the friction clutch.

REFERENCE CHARACTERS

A operating region
B operating region
C operating region
D operating region
E operating region
F operating region
M torque
$M_{Acc}$ acceleration torque
$M_{FW}$ drive resistance torque
$M_M$ engine torque
$M_M'$ engine torque
$M_{idle}$ idle speed torque
$M_{max}$ maximum torque
$M_S$ intake torque
$M_{soll}$ target torque
$M_{VL}$ full load torque
n speed of rotation
$n_{GE}$ transmission input speed
$n_{GE}'$ transmission input speed
$n_{idle}$ idle speed of rotation
$n_{L\_min}$ boost threshold speed
$n_{lim}$ cut-off speed
$n_M$ engine speed
$n_{Ziel}$ coupling speed
p pressure
$p_L$ charge pressure
$p_{L\_min}$ boost threshold value
$P_1$ operating point
$P_2$ operating point
$P_3$ operating point
$P_3'$ operating point
$P_3''$ operating point
t time
t0 point in time
t0' point in time
t1 point in time
t1' point in time
t1" point in time
t1* point in time
t2 point in time
t2' point in time
t2* point in time
V operating region
$\Delta n_M$ increase in speed

The invention claimed is:

1. A method of gearshift control of a motor vehicle having a drive train comprising a drive engine, which is built as a turbo-charged internal combustion engine, a startup clutch and a shift clutch, which is built as an automated friction clutch, and a transmission which is built as an automatic stepped transmission, so as to avoid torque deficiencies of the drive engine occurring during a build-up of load at an end of a tractive upshift, the method comprising the steps of:

accelerating the drive engine up to either a boost threshold speed ($n_{L\_min}$) or an engine speed ($n_M$) slightly above the boost threshold speed ($n_{L\_min}$) after disengagement of a load gear, at the earliest, and at a start of the build-up of load after engagement of a target gear ($n_M = n_{L\_min}$; $n_M = n_{L\_min} + \Delta n_M$), at the latest; and loading the drive engine, during the build-up of load, at a substantially constant engine speed ($n_M \approx n_{L\_min}$) beyond an intake torque ($M_S$) of the drive engine to nearly a full load torque ($M_{VL}(n_{L\_min})$) before ending a slipping operation of the friction clutch.

2. The method according to claim 1, further comprising the step of holding the drive engine at a present engine speed ($n_M = n_{L\_min}$; $n_M = n_{L\_min} + \Delta n_M$) and a present engine torque ($M_M \approx M_{VL}(n_{L\_min})$), and holding the friction clutch at a present degree of disengagement until the friction clutch is adjusted to run synchronously ($n_M = n_{GE}$), and then completely engaging the friction clutch.

3. The method according to claim 2, further comprising the step of holding the drive engine at the present engine speed ($n_M = n_{L\_min}$; $n_M = n_{L\_min} + \Delta n_M$) and the present engine torque ($M_M \approx M_{VL}(n_{L\_min})$), when the present engine torque ($M_{VL}(n_{L\_min})$) substantially corresponds to a present target torque ($M_{soll}$) of the drive engine ($M_{VL}(n_{L\_min}) \approx M_{soll}$), until complete engagement of the friction clutch.

4. The method according to claim 1, further comprising the step of lowering the engine speed ($n_M$) to a transmission input speed ($n_{GE}$), ($n_M = n_{GE}$, $n_M < n_{L\_min}$), by at least one of further engaging the friction clutch and an intervention in engine control, and then completely engaging the friction clutch.

5. The method according to claim 4, further comprising the step of only reducing the engine speed ($n_M$) below the boost threshold speed ($n_{L\_min}$) when a charge pressure ($p_L$) of the drive engine exceeds a characteristic boost threshold value ($p_{L\_min}$) due to the exhaust gas turbo-charger for a charge pressure build-up ($p_L > p_{L\_min}$), and when increased engine torque ($M_M = M_{VL}(n_{L\_min})$ is consistently available.

6. The method according to claim 4, further comprising the step of reducing the engine speed (%) below the boost threshold speed ($n_{L\_min}$) only when a present engine torque ($M_{VL}(n_{L\_min})$) lies significantly above a target torque ($M_{soll}$) of the drive engine ($M_{VL}(n_{L\_min}) \gg M_{soll}$), and when the engine torque ($M_{VL}(n_M)$), at the reduced engine speed ($n_M < n_{L\_min}$), at least has not fallen below a drive resistance torque ($M_{FW}$) ($M_{VL}(n_M) \geq M_{FW}$).

7. The method according to claim 1, further comprising the step of setting the drive engine to a higher engine speed ($n_M > n_{L\_min}$) and a higher engine torque ($M_M > M_{VL}(n_{L\_min})$) by increasing the engine power and further engagement of the friction clutch, and holding the drive engine there until the friction clutch runs synchronously ($n_M = n_{GE}$), and then completely engaging the friction clutch.

8. The method according to claim 7, further comprising the step of increasing the engine speed ($n_M$) above the boost threshold speed ($n_{L\_min}$) only when a present engine torque ($M_{VL}(n_{L\_min})$) lies significantly below a target torque ($M_{soll}$) of the drive engine ($M_{VL}(n_{L\_min}) \ll M_{soll}$), and when the engine torque ($M_{VL}(n_M)$) at the increased engine speed ($n_M < n_{L\_min}$) does not fall below at least a drive resistance torque ($M_{FW}$) ($M_{VL}(n_M) \geq M_{FW}$).

9. The method according to claim 1, further comprising the step of detecting either a present or an immediately impending torque deficiency of the drive engine when the engine speed ($n_M$), during the shift-dependent interruption of the tractive force, falls below the boost threshold speed ($n_{L\_min}$) of the drive engine ($n_M < n_{L\_min}$) and, after completion of the upshift, a drive resistance torque ($M_{FW}$) lies above the intake torque ($M_S$) of the drive engine ($M_{FW} > M_S$).

10. The method according to claim 1, further comprising the step of detecting either a present or an immanent torque deficiency of the drive engine when a coupling speed ($n_{Ziel}$) of a current upshift lies below the boost threshold speed ($n_{L\_min}$) of the drive engine, thus ($n_{Ziel} < n_{L\_min}$), and a drive resistance torque ($M_{FW}$), after completing the upshift, lies above the intake torque ($M_S$) of the drive engine ($M_{FW} > M_S$).

11. The method according to claim 1, further comprising the step of detecting either a present or an immanent torque deficiency of the drive engine when a charge pressure ($p_L$) of the drive engine, during a shift-dependent interruption of tractive force, falls below a boost threshold value ($p_{L\_min}$) ($p_L < p_{L\_min}$), and a drive resistance torque ($M_{FW}$), after conclusion of the upshift, lies above the intake torque ($M_S$) of the drive engine ($M_{FW} > M_S$).

12. The method according to claim 1, further comprising the step of continuously determining a present target torque ($M_{soll}$) of the drive engine, and a determining that a premature transition occurs to normal gearshift control or drive control when the present target torque ($M_{soll}$), either attains or falls below the intake torque ($M_S$) of the drive engine ($M_{soll} \leq M_S$).

13. The method according to claim 1 further comprising the step of continuously determining at least one of thermal and mechanical loading of the friction clutch and determining a premature transition to either normal gearshift control or a drive control occurs when the current loading of the friction clutch either reaches or exceeds a predetermined load limit value.

14. The method according to claim 1, further comprising the step of determining one of thermal and mechanical loading of the friction clutch, caused by the gearshift control, ahead of time, and performing the gearshift control only when one of the thermal and the mechanical loading of the friction clutch is not expected to reach or exceed a predetermined load limit value.

15. The method according to claim 1, further comprising the step of determining, ahead of time, a maximum torque ($M_{max}$) of the drive engine that can be attained due to the gearshift control, and performing the gearshift control only when the maximum torque that can be attained at least does not fall below a present drive resistance torque ($M_{FW}$) ($M_{max} \geq M_{FW}$).

16. The method according to claim 1, further comprising the step of performing a drive control only when a gas pedal setting either attains or exceeds a pre-determined limit setting.

17. The method according to claim 1, further comprising the step of performing a drive control only when the drive control is released as either a vehicle-specific a or use-specific special function.

18. A method of controlling a gearshift in a drive train of a motor vehicle with which torque deficiencies of a turbo-charged internal combustion engine that occur, during a build-up of load at an end of a tractive upshift, are avoided, the drive train comprising the turbo-charged internal combustion engine, a startup clutch and a shift clutch built as an automated friction clutch and an automatic stepped transmission, the method comprising the steps of:

disengagement of a load gear;

accelerating the turbo-charged internal combustion engine up to at least a boost threshold speed ($n_{L\_min}$);

engaging a target gear and starting a build-up of load of the turbo-charged internal combustion engine ($n_M = n_{L\_min}$; $n_M = n_{L\_min} + \Delta n_M$);

loading the turbo-charged internal combustion engine at a substantially constant engine speed ($n_M = n_{L\_min}$) beyond an intake torque ($M_S$) of the turbo-charged internal combustion engine to nearly a full load torque ($M_{VL}(n_{L\_min})$); and fully engaging the friction clutch.

\* \* \* \* \*